US010149056B1

(12) United States Patent
Zhang et al.

(10) Patent No.: US 10,149,056 B1
(45) Date of Patent: Dec. 4, 2018

(54) SYSTEM FOR CONFIGURING AUDIO DEVICES TO DISTRIBUTE AUDIO DATA

(71) Applicant: AMAZON TECHNOLOGIES, INC., Seattle, WA (US)

(72) Inventors: Shengwei Zhang, Fremont, CA (US); Alexander Feldman, San Ramon, CA (US); Jin Guo, Cupertino, CA (US); Ashish Shukla, Milpitas, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/373,677

(22) Filed: Dec. 9, 2016

(51) Int. Cl.
| | |
|---|---|
| *G06F 17/00* | (2006.01) |
| *H04R 3/12* | (2006.01) |
| *H04W 24/02* | (2009.01) |
| *H04L 12/26* | (2006.01) |
| *H04B 17/318* | (2015.01) |
| *H04L 5/00* | (2006.01) |
| *H04R 27/00* | (2006.01) |
| *H04W 4/80* | (2018.01) |
| *H04W 84/18* | (2009.01) |
| *H04W 84/20* | (2009.01) |

(52) U.S. Cl.
CPC ............. *H04R 3/12* (2013.01); *H04B 17/318* (2015.01); *H04L 5/006* (2013.01); *H04L 43/0847* (2013.01); *H04L 43/16* (2013.01); *H04R 27/00* (2013.01); *H04W 4/80* (2018.02); *H04W 24/02* (2013.01); *H04R 2420/07* (2013.01); *H04W 84/18* (2013.01); *H04W 84/20* (2013.01)

(58) Field of Classification Search
CPC ....... H04R 3/12; H04R 2420/07; H04R 27/00
See application file for complete search history.

(56) References Cited

U.S. PATENT DOCUMENTS

| | | | |
|---|---|---|---|
| 8,214,447 | B2 | 7/2012 | Deslippe et al. |
| 8,244,916 | B1 | 8/2012 | Loc et al. |
| 9,078,072 | B2 | 7/2015 | Sundaresan et al. |

(Continued)

OTHER PUBLICATIONS

W. H. Kuo and J. F. Lee, "Multicast Routing Scheme for Recipient Maximization in Wireless Relay Networks," in IEEE Transactions on Vehicular Technology, vol. 59, No. 8, pp. 4002-4011, Oct. 2010.*

(Continued)

*Primary Examiner* — Joseph Saunders, Jr.
(74) *Attorney, Agent, or Firm* — Lindauer Law, PLLC

(57) ABSTRACT

Described are techniques for configuring a group of devices to distribute and receive data in a manner that reduces consumption of network resources. A larger group of devices may be divided into subsets of devices, each subset including a master device that provides data to multiple slave devices via a multicast transmission. A master device may be determined based on the respective signal quality between the audio devices and an access point, and the number of other audio devices to which each respective audio device may provide data. Other devices having respective signal quality for communication with the master device that exceeds a threshold may be designated as slave devices. Once a first subset is formed, the remaining devices may be grouped into additional subsets. Remaining devices that are not a part of any subset may receive data via communication with an access point.

20 Claims, 6 Drawing Sheets

(56) References Cited

U.S. PATENT DOCUMENTS

| | | |
|---|---|---|
| 9,325,597 B1 | 4/2016 | Clasen et al. |
| 9,331,799 B2 | 5/2016 | Gao et al. |
| 2002/0172176 A1 | 11/2002 | Moss |
| 2003/0007456 A1 | 1/2003 | Gupta |
| 2004/0258033 A1 | 12/2004 | Heinonen et al. |
| 2005/0219268 A1 | 10/2005 | Kyle |
| 2006/0149850 A1 | 7/2006 | Bowman |
| 2008/0192773 A1 | 8/2008 | Ou et al. |
| 2009/0124233 A1 | 5/2009 | Morris |
| 2009/0147746 A1* | 6/2009 | Alay .................. H04B 5/02 370/329 |
| 2009/0190581 A1 | 7/2009 | Chang et al. |
| 2012/0237054 A1 | 9/2012 | Eo et al. |
| 2012/0271902 A1 | 10/2012 | Baliga et al. |
| 2012/0303705 A1 | 11/2012 | Park et al. |
| 2016/0350067 A1 | 12/2016 | Sundaresan et al. |
| 2017/0019197 A1 | 1/2017 | Rajapakse et al. |
| 2017/0055020 A1 | 2/2017 | Shaw et al. |
| 2017/0098466 A1 | 4/2017 | Elliot et al. |

OTHER PUBLICATIONS

D'Agosta, Stephen M., "Non-final Office Action dated Feb. 16, 2018", U.S. Appl. No. 15/245,897, The United States Patent and Trademark Office, Feb. 16, 2018.

Bernardi, Brenda C., "Notice of Allowance dated Dec. 28, 2017", U.S. Appl. No. 15/421,014, The United States Patent and Trademark Office, Dec. 28, 2017.

Bernardi, Brenda C., "Notice of Allowance dated May 25, 2017", U.S. Appl. No. 15/246,070, The United States Patent and Trademark Office, May 25, 2017.

Bernardi, Brenda C., "Non-final Office Action dated Jun. 14, 2018.", U.S. Appl. No. 15/926,904, The United States Patent and Trademark Office, Jun. 14, 2018.

D'Agosta, Stephen M., "Final Office Action dated Jun. 14, 2018", U.S. Appl. No. 15/245,897, The United States Patent and Trademark Office, Jun. 14, 2018.

\* cited by examiner

SYSTEM FOR CONFIGURING AUDIO DEVICES TO DISTRIBUTE AUDIO DATA

BACKGROUND

When providing a synchronized audio output using a group of networked devices, the manner in which the particular devices receive and distribute audio data may affect which devices may be used to generate the output.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
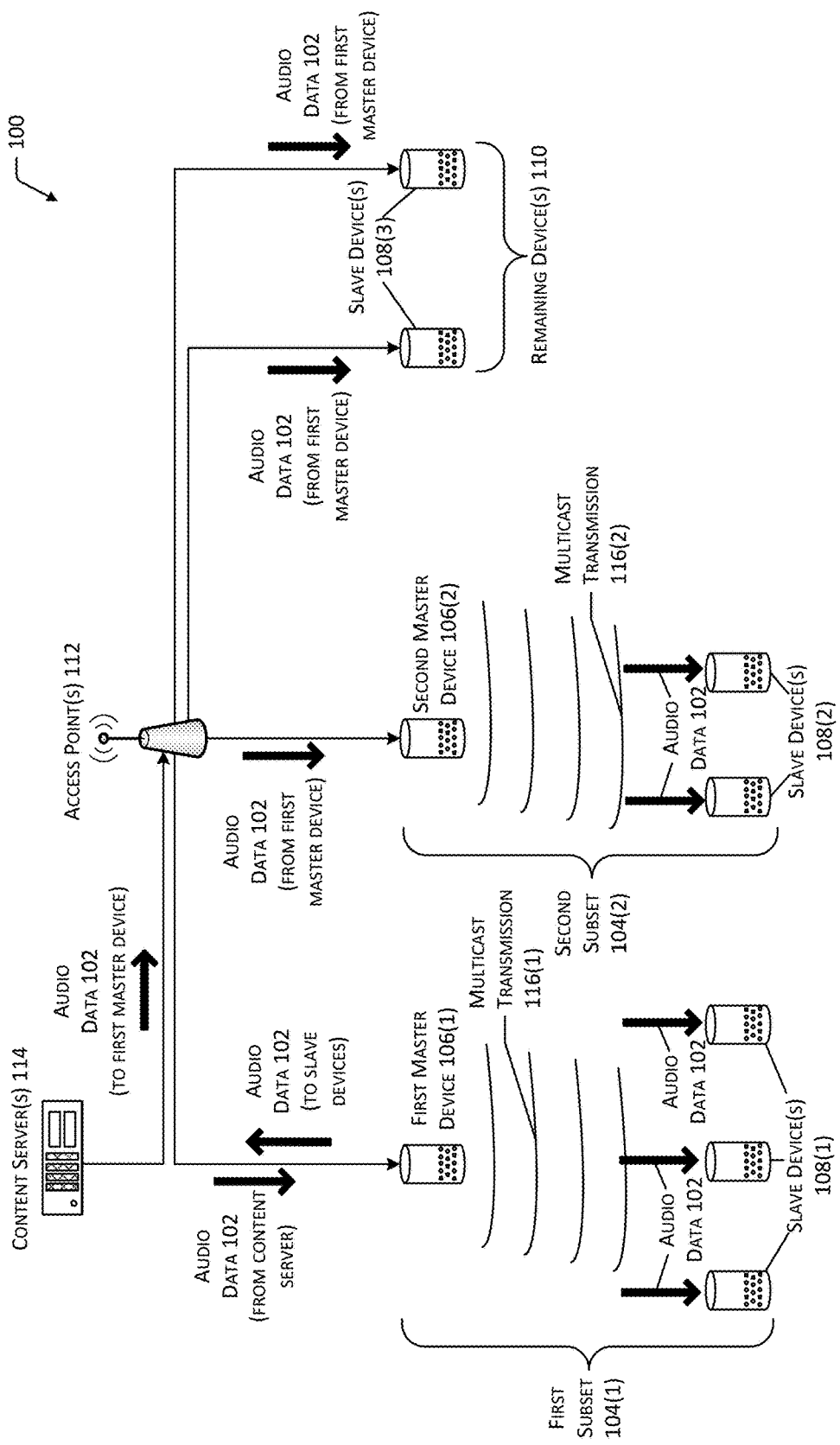
FIG. 1 depicts an implementation of a system for distributing audio data to a group of audio devices that has been divided into one or more subsets of devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Audio systems may include multiple audio devices, in communication with one another via one or more networks, to provide a synchronized audio output to users within an environment. In some cases, a user may select a particular group of audio devices to be used, such as a set of audio devices within a particular room of a home, all of the audio devices located on a particular floor of the home, all of the audio devices located within the entire home, and so forth. The user may also select a particular audio application for use or particular audio content for output. Based on the location and other characteristics of each audio device, the timing and volume of the audio output for each audio device may be configured. For example, a time delay between various audio streams provided to different devices may be used to synchronize the audio output. As another example, different devices may be used to provide audio output at different volumes based on distance from a listening position, different channels of a surround-sound output, and so forth.

However, the number of audio devices that may be used to generate an audio output, the particular audio devices that may be used, and the quality of the audio output may be affected by characteristics of the network(s) by which the devices communicate, and by characteristics of the devices themselves. For example, the number or type of devices that may be simultaneously used to share data using a home Wi-Fi® network may be constrained by the limited bandwidth of the network. Continuing the example, to initiate an audio output, multiple audio devices may receive audio data from a server or other remote data source via a communication link with an access point. Providing multiple copies of the same audio data to a large number of audio devices using the access point may inefficiently utilize network resources, limiting the number of devices that may be used to generate the output.

Described in this disclosure are techniques for configuring the manner in which audio devices within a group distribute data to one another to generate a synchronized audio output. The manner in which the audio devices are configured may reduce the network resources used to generate the audio output. For example, if multiple audio devices are grouped into a subset that may receive a single copy of audio data via a multicast transmission, this may avoid the need to provide each individual device with a respective copy of the audio data via a communication link with an access point. Continuing the example, if a large group of audio devices is subdivided into multiple subsets that may receive single copies of the audio data via a multicast transmission, use of a large group of audio devices may be supported without exceeding the limited resources of a network.

Example implementations for forming a group of audio devices in which a master device distributes audio data to multiple slave devices via a multicast transmission are described in U.S. patent application Ser. No. 15/246,070, filed Aug. 24, 2016, entitled "System for Configuring Distributed Audio Output Using a Designated Audio Device", which is incorporated by reference herein in its entirety. Example implementations for distributing data to generate an audio output using multiple devices are described in U.S. patent application Ser. No. 15/357,579, filed Nov. 21, 2016, entitled "System for Distributing Audio Output using Multiple Devices", which is incorporated by reference herein in its entirety.

In some cases, responsive to a control command from a user device, a server, or one of the audio devices, a group of audio devices may be formed. For example, a control command may be provided to one or more audio devices from a user device, such as a smartphone, tablet computer, remote control, or other type of computing device, such as using a Wi-Fi® or Bluetooth® connection. As another example, a control command may be received, by an audio device or other devices in communication therewith, from a remote device, such as a server. The server may provide the control command responsive to input from a user device. As yet another example, a control command may be provided to an audio device directly, such as through audio input provided to a microphone, user input provided via one or more buttons, and so forth. In other cases, a group of audio devices may be formed prior to receipt of a control command. For example, each of the audio devices within a particular room of a structure may be designated as part of a group of devices, and the group of devices may be configured to generate a synchronized output in advance of a command to do so.

To determine the manner in which a group of audio devices may be configured for distribution of data, signal quality data indicative of the strength or other aspects of signals, such as an absence of errors or abnormalities, communicated between the audio devices and an access point, and between the audio devices and various other audio devices, may be determined. Signal quality data may include one or more of Received Signal Strength Indications (RSSI), Signal-to-Noise Ratios (SNR), Packet Error Rates (PER), or other indications of the strength, throughput, or quality of signals used to transmit data between devices. In some implementations, the audio devices may periodically generate signal quality data indicative of the signal quality for communications between each audio device and an access point, and between each audio device and each other audio device within a group. For example, a group of audio devices may be configured to determine the signal quality of such communications at selected time intervals, such as once every sixty seconds during times when the audio devices are not generating an audio output or transmitting other data.

Devices having a poor signal quality value associated with communications between the device and an access point may not be suitable for use as a master device. For example, because a master device receives audio data via a communication link with the access point for distribution to other devices, a poor quality communication link with the access point may increase the network airtime used by the master device to receive the audio data and increase the possibility of lost packets or other errors. Therefore, in some implementations, based on the signal quality data associated with communication between a group of audio devices and the access point, a subset of audio devices having a signal quality sufficient for use as a master device may be determined. For example, each device within the subset may have a signal quality value that exceeds a threshold signal quality value. In some implementations, the threshold signal quality value may include a minimum value that corresponds to a data throughput suitable for distributing the audio data within a selected amount of time. For example, due to the non-linear relationship between RSSI and throughput, devices that determine a RSSI value of −55 dB or greater may achieve a throughput that approaches the maximum capabilities of the device. Continuing the example, exceeding a RSSI value of −55 dB may result in only a marginally greater throughput, while a RSSI value of less than −55 dB may result in significantly lower throughput. As another example, a RSSI value of −61 dB may achieve a data throughput of approximately 40 Mbps, which is sufficient for generating an audio output using most audio applications. In some implementations, the threshold signal quality may be selected based on a capacity of network resources associated with the network used by the audio devices. For example, a device associated with a threshold RSSI value of −55 dB may achieve a data throughput rate for transmission of the audio data that will consume a quantity of network resources less than the maximum capacity of the network.

After determining a subset of devices having a signal quality that exceeds a threshold, one or more particular devices that are able to communicate data to a greatest number of other devices may be determined. The ability of a particular device to provide data to other devices within a particular range may be affected by characteristics of the device itself, such as the maximum transmission power associated with an antenna, radio, or transmitter. The ability of the particular device to provide data to other devices may also be affected by the location of the particular device relative to other devices, the placement of other objects that may affect the transmission of signals, the presence of noise or other network conditions, and so forth. Designating a particular device that is able to communicate data to the greatest number of other devices as a master device may enable a single copy of the audio data to be distributed to the largest possible number of devices, reducing the network resources used to distribute the audio data and generate an output. In cases where multiple devices are able to communicate with the same number of audio devices, the particular device having the greater signal quality associated with communication with the access point may be designated as the master device. In some implementations, the ability of a particular audio device to communicate with at least a threshold number of devices, rather than a greatest number of devices, may be determined. For example, providing audio data from a single audio device to at least a threshold number of devices may reduce the airtime or other network resources consumed by the particular audio device to a quantity less than a maximum capacity of the network. As such, the threshold count of devices may be selected based on the capacity of network resources associated with the network. In some cases, the threshold count may be selected based on characteristics of the network or devices. For example, devices transmitting using a greater data rate or Modulation and Coding Scheme (MCS) may utilize a smaller quantity of network resources than devices using a lesser data rate or MCS. As such, the threshold count of devices that use a greater data rate may be less than a threshold count of devices that use a lesser data rate.

A subset of devices within the group of devices may be formed based on the designation of the particular device as a master device. At least a portion of the devices that may receive data from the master device may be designated as slave devices within the subset. In some implementations, the particular devices that are designated as slave devices may be determined based on signal quality data indicative of the strength or quality of communications between the particular devices and the master device. For example, the devices that are designated as slave device may have a signal quality value, associated with communication with the master device, that exceeds a threshold value. In some implementations, the threshold value used for determining slave devices may differ from the threshold value used to determine potential master devices. For example, the threshold value used to determine potential master devices may be a RSSI value of −61 dB or greater, while the threshold value used to determine potential slave devices may be a RSSI value of −70 dB or greater. When audio data is distributed to the group of audio devices, the master device may receive the audio data via a communication link with the access point and provide the audio data to the other devices within the subset via a multicast transmission. The other devices may receive the audio data via the multicast transmission, such as by activating a multicast receiver responsive to a command from a control device or the master device.

If the subset does not include all of the devices in the group of audio devices, then the remaining devices may be used to form additional subsets, or may receive the audio data via a communication link with the access point. For example, the process for determining a master device and forming a subset of devices, described previously, may be repeated for the remaining audio devices within the group. Continuing the example, one or more audio devices having signal quality values for communication with the access point that exceeds a threshold may be determined. A particular audio device from among these devices that is able to communicate with the greatest number of the remaining audio devices may be designated as a master device. If multiple audio devices may communicate with the same number of the remaining audio devices, the particular audio device having the greatest signal quality for communication with the access point may be designated as the master device. At least a portion of the remaining devices having a signal quality for communication with the master device that exceeds a threshold may be designated as slave devices, and a second subset of devices may be formed. The master device for the second subset may receive audio data via the access point and distribute the audio data to the slave devices of the second subset via a multicast transmission. The process for determining subsets of audio devices may be repeated for any remaining devices after formation of the second subset, and after formation of each subsequent subset, until the formation of subsets of devices is no longer possible.

If the group of devices includes any remaining devices that may not be included in a subset for transmitting or receiving the audio data via a multicast transmission, those remaining devices may receive the audio data via a communication link with the access point. Example implementations for forming a group of audio devices associated with an access point are described in U.S. patent application Ser. No. 15/245,897, filed Aug. 24, 2016, entitled "System for Configuring Distributed Audio Output Using an Access Point", which is incorporated by reference herein in its entirety.

In some implementations, the audio devices that receive the audio data via the access point may be determined based on signal quality data. For example, if an audio device has signal quality values associated with communication with the access point or one or more other audio devices that are less than one or more threshold values, the audio device may be excluded from one or more subsets and may instead be configured to receive the audio data via the access point. As another example, if the number of remaining audio devices that are not part of a subset is less than a threshold count, such as fewer than three devices, formation of an additional subset may not improve the utilization of network resources, and the audio devices may instead receive the audio data via the access point.

While implementations in this disclosure describe use of audio devices to produce an audio output based on audio data, in other implementations, techniques described herein may be used to produce other types of outputs using other types of devices and other types of data. For example, video data may be provided to one or more groups of video devices using techniques described herein for generation of a video output using multiple devices.

FIG. 1 depicts an implementation of a system 100 for distributing audio data 102 to a group of audio devices that has been divided into one or more subsets 104 of audio devices. The group of audio devices is shown including a first master device 106(1) and first group of slave devices 108(1) within the first subset 104(1) and a second master device 106(2) and a second group of slave devices 108(2) within the second subset 104(2). The group of audio devices also includes two remaining devices 110 that are not included within the first subset 104(1) or second subset 104(2) of devices, that function as slave devices 108(3) that receive the audio data 102 from one of the master devices 106. FIG. 1 depicts the group of audio devices including nine total audio devices, the first subset 104(1) including one master device 106(1) and three slave devices 108(1), the second subset 104(2) including one master device 106(2) and two slave devices 108(2), and the remaining devices 110 including two additional slave devices 108(3). However, in other implementations, the system 100 may include any number of audio devices, the audio devices may be grouped into any number of subsets 104, including zero subsets 104 in some implementations, each subset 104 may include any number of slave devices 108, and the remaining devices 110 may include any number of additional devices, including zero devices in some implementations.

The audio devices may include any type of computing device capable of generating an audio output including, without limitation, a smartphone, a tablet computer, a personal computer, a wearable computer, an automotive computer, a networked speaker, a television, and so forth. The audio devices may communicate using one or more networks. For example, the audio devices may communicate using a Wi-Fi® network via connections to one or more access points 112. In other implementations, one or more of the audio devices may communicate using a Wi-Fi® Direct protocol, a Bluetooth® protocol, a Bluetooth® Low Energy protocol, or other methods of wireless communication. In still other implementations, one or more audio devices may communicate with one or more other devices via wired connections.

To generate an audio output using the group of audio devices, the first master device 106(1) may receive audio data 102 from a remote data source, such as one or more content servers 114. While FIG. 1 depicts the remote data source as one or more content servers 114, in other implementations, the source of the audio data 102 may include a local data source, such as a tablet, smartphone, or other computing device that communicates with the master device 106(1) via a Wi-Fi® or Bluetooth® connection. In still other implementations, the master device 106(1) may include fixed or removable data storage that stores the audio data 102. The first master device 106(1) may provide the audio data to the slave devices 108(1) within the first subset 104(1) using a first multicast transmission 116(1).

In some implementations, the second master device 106(2), while functioning as a master device 106 for the second subset 104(2) of devices, may also function as a slave device with respect to the first master device 106(1). For example, the second master device 106(2) may provide a request for the audio data 102 to the first master device 106(1), via a communication link with the access point(s) 112. Responsive to the request, the first master device 106(1) may provide the audio data 102 to the second master device 106(2). In other implementations, the first master device 106(1) may provide the audio data 102 to the second master device 106(2) in the absence of a request. In still other implementations, the second master device 106(2) may be configured to receive the audio data 102 via the first multicast transmission 116(1). In other implementations, the second master device 106(2) may receive the audio data 102 from the content server(s) 114 via a communication link with the access point(s) 112. After receiving the audio data 102, the second master device 106(2) may provide the audio data 102 to the slave devices 108(2) within the second subset 104(2) of devices via a multicast transmission 116(2).

The remaining devices 110 may receive the audio data 102 from the first master device 106(1) via communication links with the access point(s) 112. For example, the slave device(s) 108(3) may provide a request for the audio data 102 to the master device 106(1) via the access point(s) 112, responsive to which the master device 106(1) may provide the audio data 102 to the slave device(s) 108(3). In other implementations, the master device 106(1) may provide the audio data 102 to the slave device(s) 108(3) in the absence of a request. In still other implementations, one or more of the slave device(s) 108(3) may receive the audio data 102 from the content server(s) 114 or the second master device 106(2).

As shown in FIG. 1, the depicted system 100 may enable an audio output to be generated using nine audio devices, while providing only four copies of the audio data 102 to various devices via the access point(s) 112. As such, the network resources used to provide the audio data 102 to the audio devices may be reduced by forming one or more subsets 104 of audio devices rather than providing the audio data 102 to each audio device via the access point(s) 112.

Figure 2:
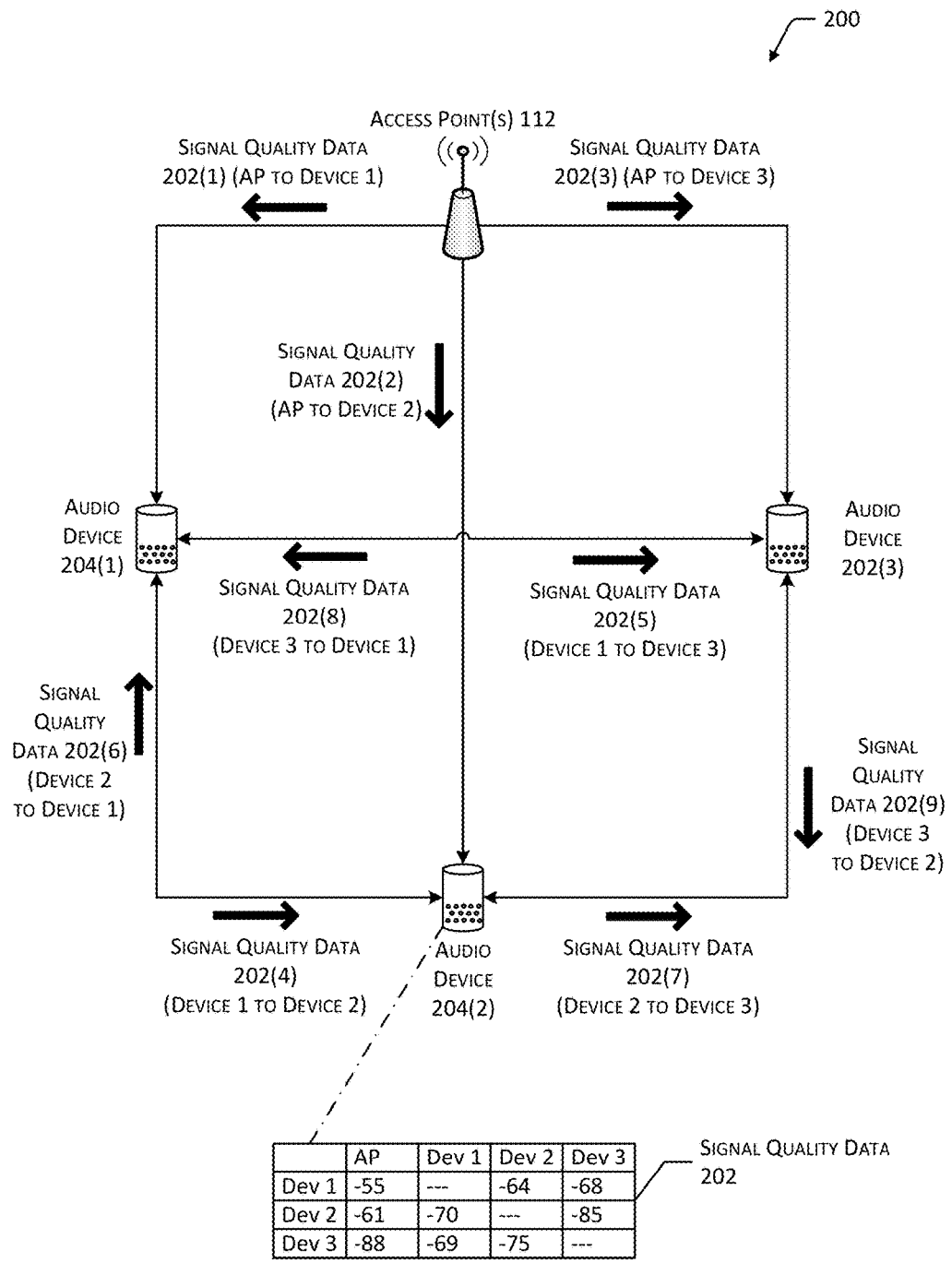
FIG. 2 depicts an implementation of a system generating signal quality data that may be used to determine the manner in which one or more audio devices are divided into subsets or otherwise configured to generate an audio output.

FIG. 2 depicts an implementation of a system 200 generating signal quality data 202 that may be used to determine the manner in which one or more audio devices 204 are divided into subsets 104 or otherwise configured to generate an audio output. The signal quality data 202 may include data indicative of one or more measurements associated with the strength or quality of signals that communicate data between the audio devices 204 and the access point(s) 112. For example, the signal quality data 202 may include one or more of a RSSI value, a SNR value, a throughput value, an airtime utilization value, an error rate (e.g., PER), or other metrics that may indicate the strength, quality, or ability of a signal to successfully transmit data to audio devices 204. The signal quality data 202 associated with each audio device 204 may depend in part on the characteristics of the audio device 204, such as the antenna, radio, or other components thereof, audio applications executed by the audio device 204, and so forth. The signal quality data 202 may also depend in part on the location of an audio device 204 relative to the access point(s) 112 or other audio devices 204. For example, a particular audio device 204 that is closer to another audio device 204 may achieve a greater signal quality for communications with that audio device 204 than with another audio device 204 that is a farther distance from the particular audio device 204. The locations of other objects, interfering devices, or other sources of noise may also affect the signal quality data 202, as may various network conditions, such as noise or airtime utilized by other devices.

The example system 200 shown in FIG. 2 includes three audio devices 204 in communication with one or more access points 112. To generate the signal quality data 202 that may be used to determine the manner in which each audio device 204 may be configured to distribute audio data 102, the audio devices 204 and access point(s) 112 may provide test signals to one another to determine the strength or quality thereof, such as by measuring a RSSI or SNR value associated with the signals. Each audio device 204 and the access point(s) 112 may then provide signal quality data 202 to one or more other audio devices 204 to facilitate the configuration of the devices into subsets 106.

For example, the access point(s) 112 may provide first signal quality data 202(1) to the first audio device 204(1), indicative of the RSSI or SNR value of signals received by the first audio device 204(1) from the access point(s) 112. The access point(s) 112 may provide second signal quality data 202(2) to the second audio device 204(2), which may be indicative of the RSSI or SNR value of signals received by the second audio device 204(2) from the access point(s) 112. The access point(s) 112 may provide third signal quality data 202(3) to the third audio device 204(3), which may be indicative of the RSSI or SNR value of signals received by the third audio device 204(3) from the access point(s) 112.

The first audio device 204(1) may provide fourth signal quality data 202(4) to the second audio device 204(2) indicative of the RSSI or SNR value of signals received by the second audio device 204(2) from the first audio device 204(1). The first audio device 204(1) may also provide fifth signal quality data 202(5) to the third audio device 204(3) indicative of the RSSI or SNR value of signals received by the third audio device 204(3) from the first audio device 204(1). The second audio device 204(2) may provide sixth signal quality data 202(6) to the first audio device 204(1) indicative of the RSSI or SNR value of signals received by the first audio device 204(1) from the second audio device 204(2). The second audio device 204(2) may provide seventh signal quality data 202(7) to the third audio device 204(3) indicative of the RSSI or SNR value of signals received by the third audio device 204(3) from the second audio device 204(2). The third audio device 204(3) may provide eighth signal quality data 202(8) to the first audio device 204(1) indicative of the RSSI or SNR value of signals received by the first audio device 204(1) from the third audio device 204(3). The third audio device 204(3) may also provide ninth signal quality data 202(9) to the second audio device 204(2) indicative of the RSSI or SNR value of signals received by the second audio device 204(2) from the third audio device 204(3).

The resulting signal quality data 202 may include a table, array, or matrix indicative of signal quality values for signals received by each audio device 204 from each other audio device 204 and from the access point(s) 112. For example, FIG. 2 depicts the signal quality data 202 as a matrix indicating RSSI values for signals received by the first audio device 204(1) from the access point(s) 112, the second audio device 204(2), and the third audio device 204(3). The signal quality data 202 also indicates RSSI values for signals received by the second audio device 204(2) from the access point(s) 112, the first audio device 204(1), and the third audio device 204(3). The signal quality data 202 additionally indicates RSSI values for signals received by the third audio device 204(3) from the access point(s) 112, the first audio device 204(1), and the second audio device 204(2).

The signal quality data 202 may be used to determine whether particular audio devices 204 are grouped into subsets 104, whether particular audio devices 204 may be designated as master devices 106 or slave devices 108, and so forth. For example, the signal quality data 202 indicative of the RSSI of signals received by a particular audio device 204 from the access point(s) 112 may be used to determine whether the particular audio device 204 may function as a master device 106. Continuing the example, if the signal quality data 202 for the particular audio device 204 exceeds a threshold value, the audio device 204 may be eligible for use as a master device 106 and may receive the audio data 102 via the access point(s) 112. Conversely, if the signal quality data 202 does not exceed the threshold value, the audio device 204 may be excluded for use as a master device 106. The signal quality data 202 indicative of the RSSI of signals received by a particular audio device 204 from the master device 106 may be used to determine whether the particular audio device 204 may be designated as a slave device 108 within the same subset 104 as the master device 106. For example, if the RSSI for the particular audio device 204 is less than a threshold value, the audio device 204 may not be grouped in the subset 104. However, if the RSSI exceeds the threshold value, the audio device 204 may be included in the subset 104 and may receive the audio data 102 from the master device 106.

Figure 3:
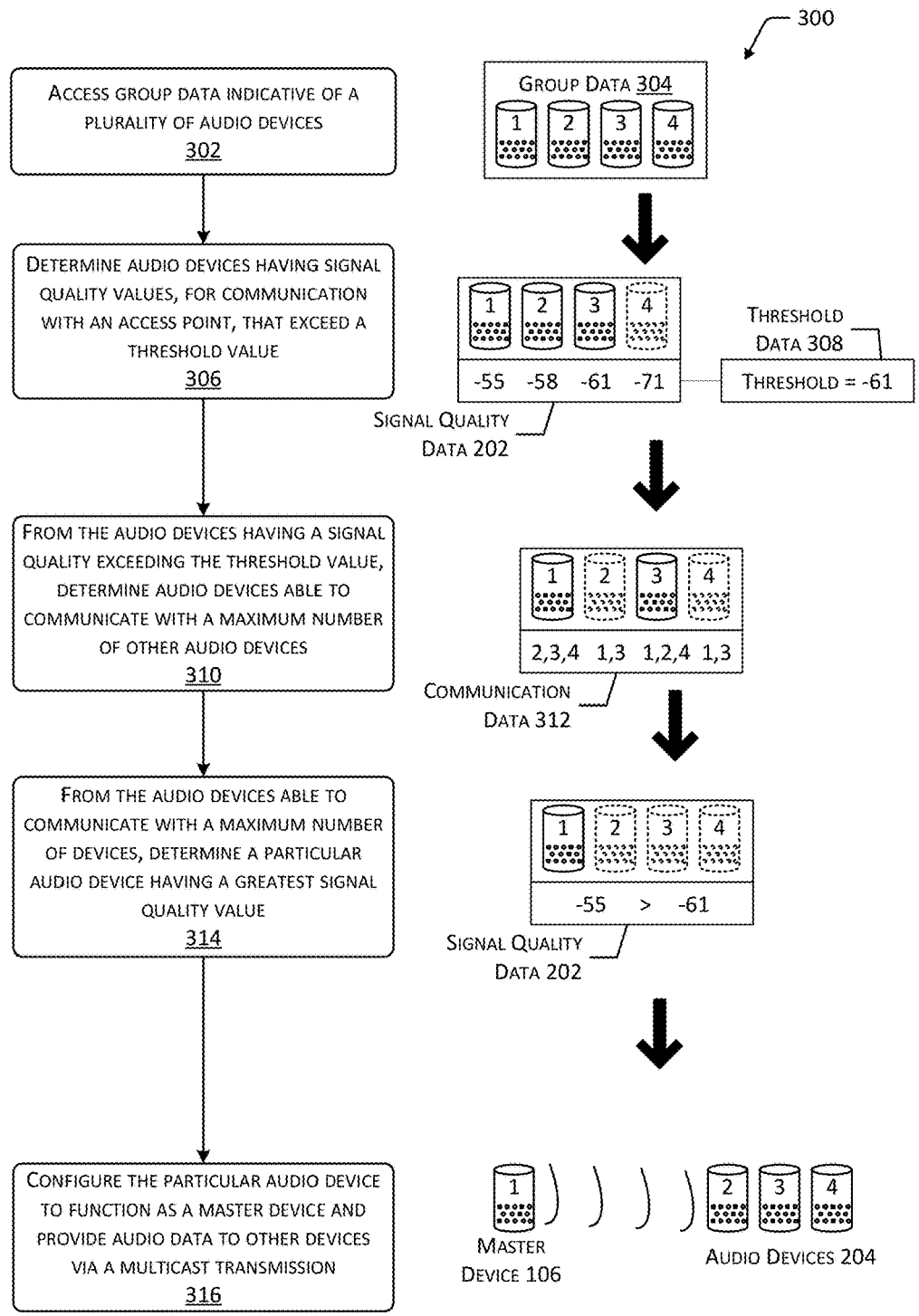
FIG. 3 depicts a scenario illustrating a method for determining a master device from a group of audio devices and configuring the master device to provide audio data to other devices via a multicast transmission.

FIG. 3 depicts a scenario 300 illustrating a method for determining a master device 106 from a group of audio devices 204 and configuring the master device 106 to provide audio data 102 to other devices via a multicast transmission 116. At 302, group data 304 indicative of a plurality of audio devices 204 may be accessed. Group data 304 may include identifiers associated with the audio devices 204, such as device names, serial numbers, network addresses, and so forth. In some implementations, group data 304 may include information regarding characteristics of the audio devices 204, such as device types, hardware or software components, audio applications, device locations, signal quality data 202, and so forth.

At 306, audio devices 204 that have signal quality values, for communication with an access point 112, that exceed a threshold value 308 may be determined. For example, each audio device 204 may communicate with one or more access points 112 via one or more networks, such as a Wi-Fi® network. Signal quality data 202 associated with each audio device 204 may include one or more values indicative of the strength, quality, capacity, or airtime utilization of communications between the audio devices 204 and the access point(s) 112. For example, the signal quality data 202 may include RSSI values for each audio device 204 indicating the strength of signals received by the audio devices 204 from the access point(s) 112. Threshold data 308 may indicate one or more threshold signal quality values. The threshold signal quality values may represent a minimum RSSI or other signal quality metric that may ensure a desired data throughput value if the associated audio device 204 is used as a master device 106. In the depicted example scenario 300, FIG. 3 shows three audio devices 204 having signal quality values that equal or exceed a threshold value, and a fourth audio device 204 having a signal quality value that does not equal or exceed the threshold value.

At 310, from among the audio devices 204 having a signal quality exceeding the threshold value, audio devices 204 that are able to communicate with a maximum number of other audio devices 204 may be determined. For example, depending on the location and characteristics of a particular audio device 204, the particular audio device 204 may be able to communicate with each of the other audio devices 204 within the group, only a portion of the audio devices 204 within the group, or none of the other audio devices 204. Communication data 312 for each audio device 204 may indicate the other audio devices 204 to which the associated audio device 204 may transmit data. For example, FIG. 3 depicts a first and third audio device 204 that are each able to communicate with three other audio devices 204. FIG. 3 also depicts a second and fourth audio device 204 that are only able to communicate with two other audio devices 204. Therefore, the first and third audio devices 204 may be used as a master device 106, while the second and fourth audio devices 204 may be excluded from use as a master device 106. In some implementations, devices that are determined to have a signal quality value less than a threshold value at 306 may be disregarded at 310. In such cases, communication data 312 for those audio devices 204 may not be determined at 310. For example, because the signal quality value for the fourth audio device 204(4) was determined to be less than the threshold value, in some implementations, communication data 312 for the fourth audio device 204(4) may not be determined.

At 314, from among the audio devices 204 that are able to communicate with a maximum number of other audio devices 204, a particular audio device 204 having a greatest signal quality may be determined. For example, FIG. 3 depicts a first and third audio device 204 that are both able to communicate with three other audio devices 204. However, the signal quality data 202 for the audio devices 204 indicates a signal quality for the first audio device 204 that exceeds the signal quality of the third audio device 204. Therefore, the first audio device 204 may function more efficiently as a master device 106 than the third audio device 204. In some implementations, if only a single audio device 204 is able to communicate with the maximum number of other audio devices 204, then the single audio device 204 may be used as a master device 106, and the functions performed at 314 may be omitted.

At 316, the particular audio device 204 having the greatest signal quality, determined at 314, may be configured to function as a master device 106 and provide audio data 102 to other audio devices 204 via a multicast transmission 116. As described with regard to FIG. 1, the master device 106 and one or more slave devices 108 may be grouped into a subset 104 of devices. The remaining devices 110 may be grouped into additional subsets 104 by repeating the process described in FIG. 3 to determine an additional master device 106. In other cases, one or more remaining devices 110 may be configured to receive audio data 102 via a communication link with the access point 112.

Figure 4:
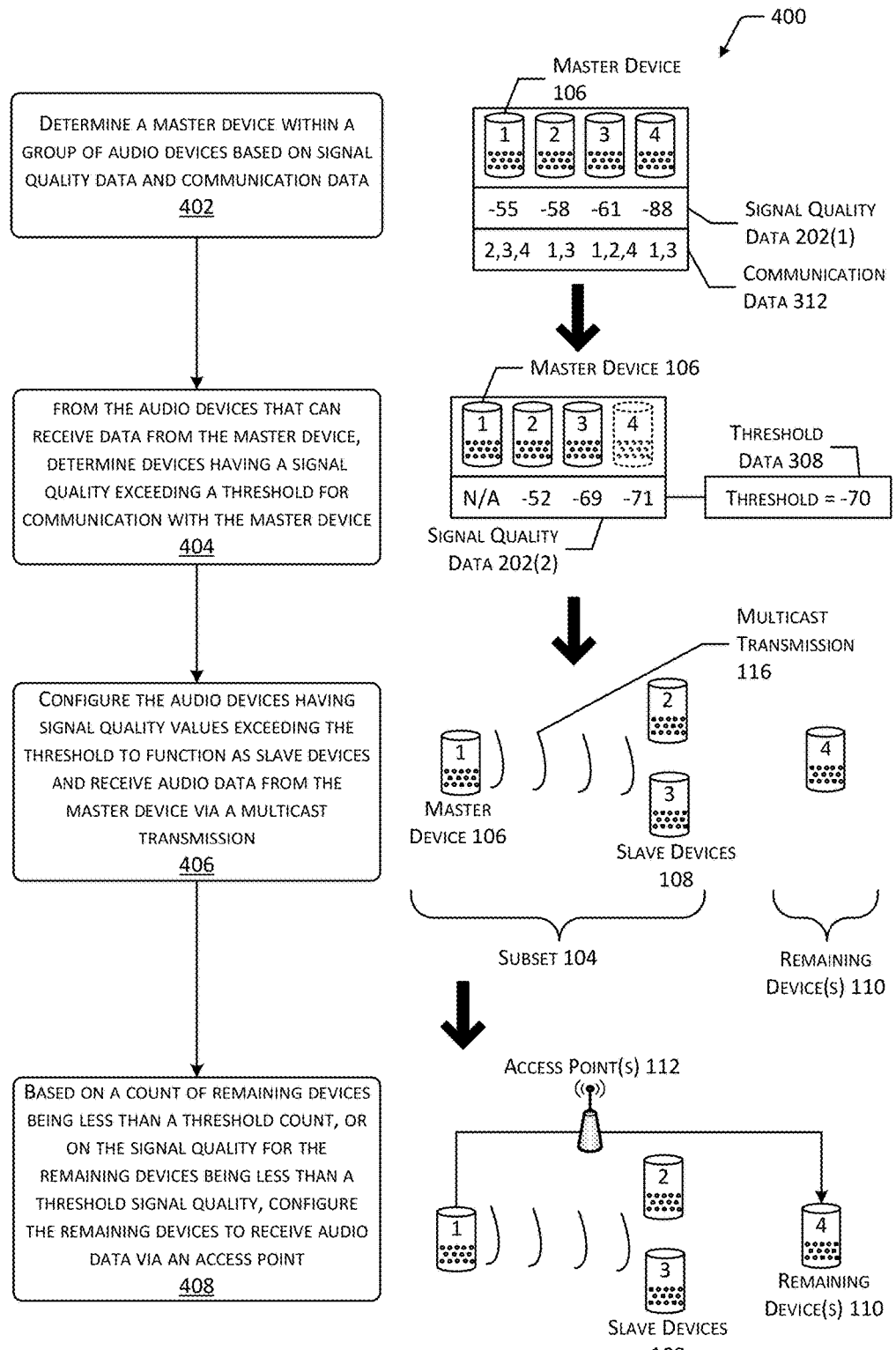
FIG. 4 depicts a scenario illustrating a method for determining slave devices to be included within a subset of devices for receiving audio data via a multicast transmission.

FIG. 4 depicts a scenario 400 illustrating a method for determining slave devices 108 to be included within a subset 104 of devices for receiving audio data 102 via a multicast transmission 116. At 402, a master device 106 within a group of audio devices 204 may be determined, based on first signal quality data 202(1) and communication data 312. For example, the process described in FIG. 3 may be used to determine a particular audio device 204 to be used as a master device 106 based on the signal quality value for that particular audio device 204 exceeding a threshold value, and the communication data 312 for that audio device 204 indicating that it may communicate with a maximum number of other audio devices 204.

At 404, from among the audio devices 204 that are able to receive data from the master device 106, the audio devices 204 having a signal quality exceeding a threshold value for communication with the master device 106 may be determined. For example, as described with regard to FIG. 2, second signal quality data 202(2) may indicate a RSSI value, SNR value, or other signal quality measurement for communications between particular audio devices 204 and other audio devices 204. Continuing the example, the signal quality data 202(2) may include the RSSI value for each audio device 204, indicative of the received signal strength of communications from the master device 106. In the example scenario 400 depicted in FIG. 4, a first audio device 204 is designated as a master device 106, a second and third audio device 204 have a signal quality value greater than a threshold value, and a fourth audio device 204 has a signal quality value less than the threshold value.

At 406, based on the determined signal quality values, the audio devices 204 having signal quality values exceeding the threshold value may be configured to function as slave devices 108. The slave devices 108 may receive audio data 102 from the master device 106 via a multicast transmission 116. As described with regard to FIG. 1, the master device 106 and the slave devices 108 having signal quality values that exceed the threshold value may be grouped into a subset 104 of devices. Remaining devices 110 not included in the subset 104 may receive the audio data 102 via a communication link with an access point 112, or may be included in a different subset 104 of devices.

At 408, based on a count of remaining devices 110 being less than a threshold count, or on the signal quality for the remaining devices 110 being less than a threshold signal quality, the remaining device(s) 110 may be configured to receive audio data 102 via an access point 112. For example, if, after formation of the subset 104, there are fewer than three remaining devices 110, each of the remaining devices 110 may be configured to receive the audio data 102 via an access point 112. As another example, if, after formation of the subset 104, each remaining device 110 has a signal quality value for communication with the access point 112 or with one or more other devices that is less than a threshold value, formation of an additional subset 104 may not be suitable, and the remaining devices 110 may instead receive the audio data 102 via the access point 112. In other implementations, the remaining devices 110 may be used to form one or more additional subsets 104 of devices. For example, the processes depicted in FIGS. 3 and 4 may be performed using the remaining devices 110 to determine a second master device 106 and one or more slave devices 108 for inclusion in a subsequent subset 104 of devices. Additional subsets 104 may be formed until the count of remaining devices 110 or the signal quality values for the remaining devices 110 are below corresponding threshold values. Continuing the example, the master device 106 of a first subset 104 of devices may provide the audio data 102 to the second master device 106(2) and to the master devices 106 of any other subsets 104 devices, via the access point 112. The master device 106 of the first subset 106 may also provide the audio data 102 to any remaining devices 110 that are not part of a subset 104 in the same manner that the audio data 102 is provided to a master device 106 of a subset 104. For example, each remaining device 110 may be treated in the same manner as a subset 104 containing a single audio device 204.

Figure 5:
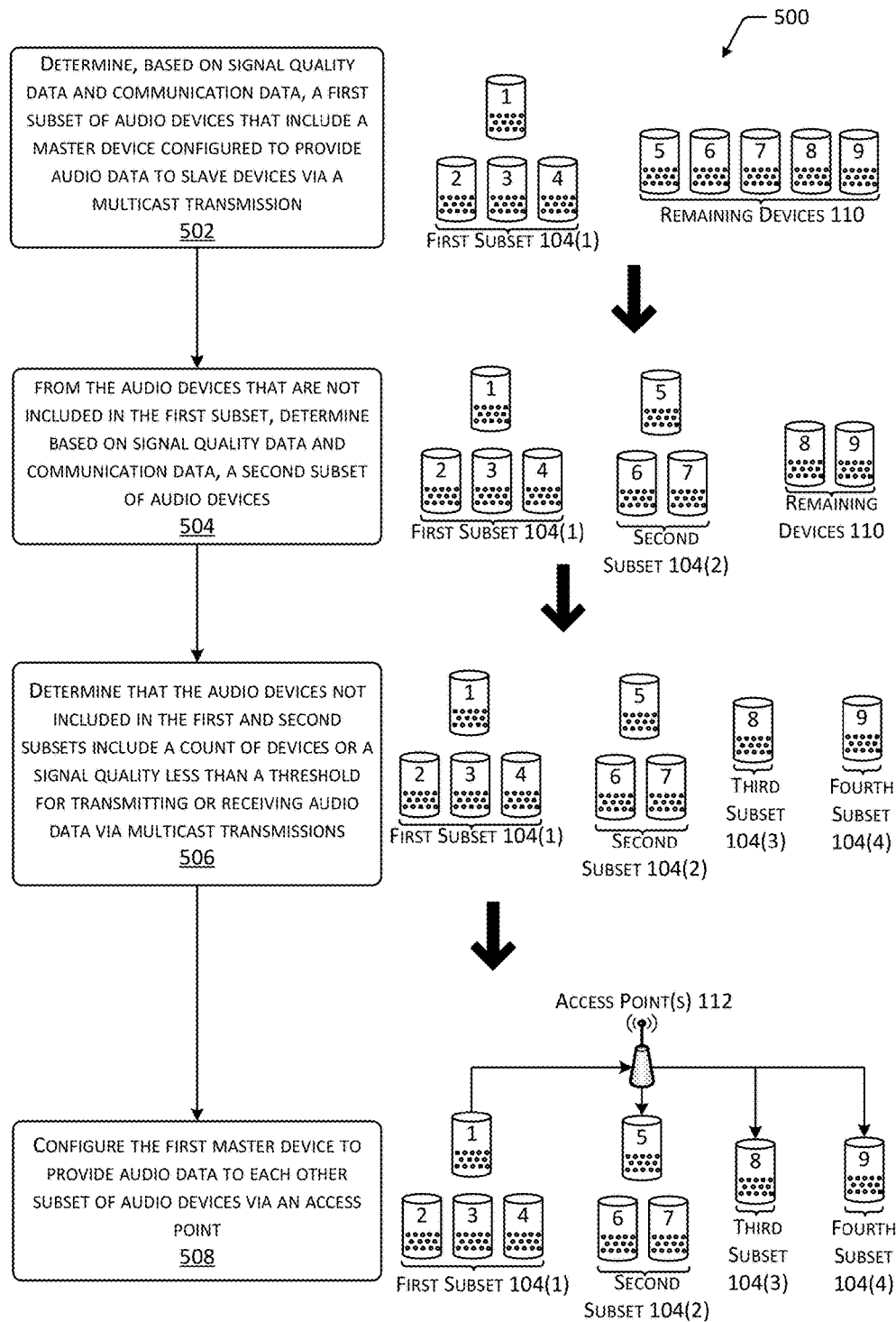
FIG. 5 depicts a scenario illustrating a method for forming multiple subsets of audio devices and distributing audio data to each subset.

FIG. 5 depicts a scenario 500 illustrating a method for forming multiple subsets 104 of audio devices 204 and distributing audio data 102 to each subset 104. At 502, based on signal quality data 202 and communication data 312, a first subset 104(1) of audio devices 204 may be determined. The first subset 104(1) may include a master device 106 configured to provide audio data 102 to slave devices 108 via a multicast transmission 116. One method by which the subset 104(1) of audio devices 204 may be formed is described with regard to FIGS. 3 and 4. One or more remaining devices 110 may not be included in the first subset 104(1). For example, the remaining devices 110 may be unable to communicate with the master device 106 of the first subset 104(1) or the signal quality of such communications may be less than a threshold signal quality.

At 504, from the audio devices 204 that are not included in the first subset 104(1), a second subset 104(2) of audio devices 204 may be determined based on signal quality data 202 and communication data 312. The second subset 104(2) may include a master device 106 that is configured to provide audio data 102 to slave devices 108 via a multicast transmission 116. One or more remaining devices 110 may not be included in the first subset 104(1) or the second subset 104(2).

At 506, it may be determined that the audio devices 204 not included in the first subset 104(1) or second subset 104(2) may include a count of devices or a signal quality less than a corresponding threshold value. In such cases, the remaining devices 110 may be unsuitable for transmitting or receiving audio data 102 via multicast transmissions 116. The remaining devices 110 may therefore be configured to receive audio data 102 via a communication link with an access point 112, in a manner similar to the master device 106 of the second subset 104(2). As such, each remaining device 110 may be designated as a respective subset 104 that includes a single audio device 204. For example, FIG. 5 depicts a third subset 104(3) and a fourth subset 104(4), each containing a single audio device 204.

At 508, the first master device 106(1) may be configured to provide audio data 102 to each other subset 104 of audio devices 204 via an access point 112. For example, in addition to providing audio data 102 to corresponding slave devices 108 via a multicast transmission 116, the master device 106 of the first subset 104(1) may provide audio data 102 to the master device 106 of the second subset 104(2), the single audio device 204 of the third subset 104(3), and the single audio device 204 of the fourth subset 104(4) via the access point 112. The master device 106 of the second subset 104(2) may provide the audio data 102 to corresponding slave devices 108 via a multicast transmission 116.

Figure 6:
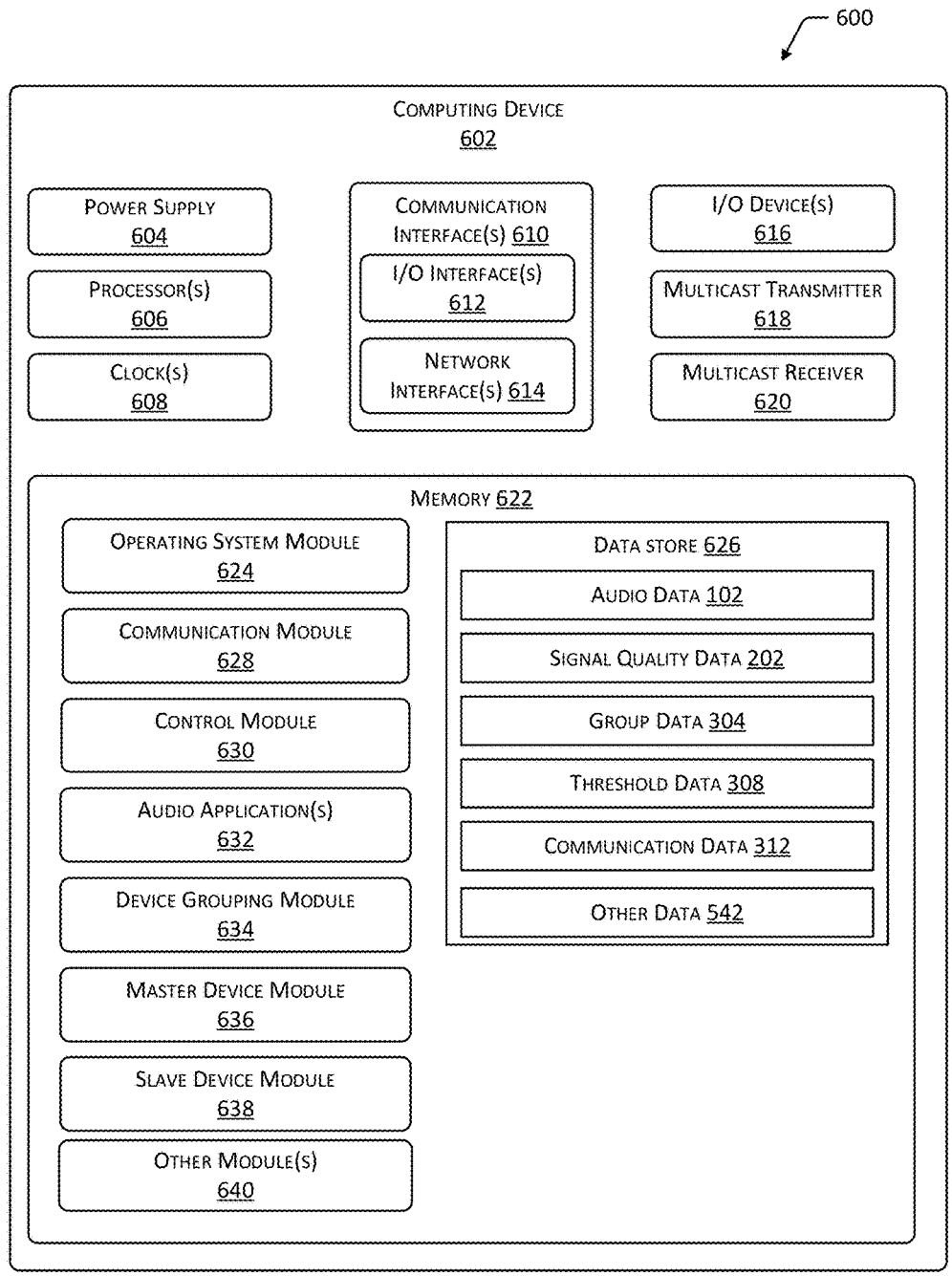
FIG. 6 is a block diagram depicting one implementation of a computing device within the scope of the present disclosure.

FIG. 6 is a block diagram 600 depicting one implementation of a computing device 602 within the scope of the present disclosure. The computing device 602 may include, without limitation, any of the devices depicted in FIG. 1, such as a master device 106, a slave device 108, or any other computing device 602 in communication with a master device 106 or slave device 108, such as a content server 114 or a control device that provides control commands or audio data 102 to the master device(s) 106 or slave device(s) 108. Additionally, while FIG. 6 depicts a single example computing device 602, multiple computing devices 602 may be used to perform the functions described herein.

The computing device 602 may include one or more power supplies 604 configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth. Continuing the example, data from a clock 608 may be used to synchronize the output of multiple audio devices 204, to determine a length of time used to generate one or more subsets 104 of audio devices 204, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components thereof. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O devices 616 may be physically incorporated with a computing device 602 or may be externally placed.

The network interfaces 614 may be configured to provide communications between the computing device 602 and other devices, such as the I/O devices 616, routers, access points 112, and so forth. The network interfaces 614 may include devices configured to couple to one or more networks including local area networks (LANs), wireless LANs (WLANs), wide area networks (WANs), wireless WANs (WWANs), and so forth. For example, the network interfaces 614 may include computing devices 602 compatible with Ethernet, Wi-Fi®, Wi-Fi Direct®, Bluetooth®, Bluetooth® Low Energy, ZigBee®, Z-Wave®, 3G, 4G, LTE, and so forth.

The computing device 602 may also include a multicast transmitter 618 that may be used to communicate data to other computing devices 602 using one or more multicast transmissions 116. The computing device 602 may further include a multicast receiver 620, which may receive data from other computing devices 602 that was provided using a multicast transmission 116.

The computing device 602 may include one or more busses or other internal communications hardware or software that allows for the transfer of data between the various modules and components of the computing device 602.

As shown in FIG. 5, the computing device 602 may include one or more memories 622. The memory 622 may include one or more computer-readable storage media (CRSM). The CRSM may be any one or more of an electronic storage medium, a magnetic storage medium, an optical storage medium, a quantum storage medium, a mechanical computer storage medium, and so forth. The memory 622 may provide storage of computer-readable instructions, data structures, program modules, audio data 102, and other data for the operation of the computing device 602. A few example modules are shown stored in the memory 622, although the same functionality may alternatively be implemented in hardware, firmware, or as a system on a chip (SoC).

The memory 622 may include one or more operating system (OS) modules 624. The OS module 624 may be configured to manage hardware resource devices such as the I/O interfaces 612, the network interfaces 614, the I/O devices 616, and to provide various services to applications or modules executing on the processors 606. The OS module 624 may implement a variant of the FreeBSD™ operating system as promulgated by the FreeBSD® Project; UNIX® or a UNIX-like operating system; a variation of the Linux™ operating system as promulgated by Linus Torvalds; the Windows® operating system from Microsoft Corporation of Redmond, Washington, USA; or other operating systems.

A data store 626 and one or more of the following modules may also be stored in the memory 622. The modules may be executed as foreground applications, background tasks, daemons, and so forth. The data store 626 may use a flat file, database, linked list, tree, executable code, script, or other data structure to store information. In some implementations, the data store 626 or a portion of the data store 626 may be distributed across one or more other devices including other computing devices 602, network attached storage devices, and so forth.

A communication module 628 stored in the memory 622 may be configured to establish communications with audio devices 204, servers, control devices, or other computing devices 602.

The memory 622 may also store a control module 630. The control module 630 may be used to generate or receive control commands that may be used to control the computing device 602 and other computing devices 602 in communication therewith. For example, a control command received by the computing device 602 may indicate particular audio data 102 to be used to generate an audio output, one or more audio applications 632 that may be used to generate the audio output based on the audio data 102, one or more audio devices 204 to be used to generate the audio output, and so forth. The control module 630 may be configured to receive control commands and access group data 304 indicative of the audio devices 204 or groups of audio devices 204 indicated by the control command(s), to determine particular audio devices 204 to be used to generate the output. As described with regard to FIGS. 1-4, the determined audio devices 204 may be divided into subsets 104 that receive audio data 102 via multicast transmissions 116 based on signal quality data 202 and communication data 312.

One or more audio application(s) 632 stored in the memory 622 may be used to generate audio output based on audio data 102. For example, an audio application 632 may cause an output device, such as a speaker, to emit sound based on audio data 102. In some implementations, the audio application(s) 632 may be configured to generate a synchronized audio output using multiple audio devices 204. For example, the audio application(s) 632 may control the times at which sounds are emitted, the volumes, frequencies, other characteristics of the emitted sounds, and so forth, to cause multiple audio devices 204 to produce a synchronized output. Continuing the example, controlling the times at which various output devices emit sound may be used to enable multiple audio devices 204 to produce complementary output at the same time. Controlling the volume of the sound emitted by output devices may enable devices to produce sounds having a desired perceived volume at a listening position, based on the position of the audio devices 204. Controlling the particular frequencies or other types of sound output using an audio device 204 may enable different devices to provide different complementary aspects of a synchronized audio output, such as different channels of a surround-sound output. In some implementations, the audio application(s) 632 may determine particular characteristics, capabilities, or locations of one or more audio devices 204, such as the distance between a particular audio device 204 and a listening position, the range of frequencies or volumes that may be emitted by the audio device 204, and so forth.

The memory 622 may additionally store a device grouping module 634. The device grouping module 634 may determine a group of audio devices 204, based on group data 304 or a control command indicating one or more audio devices 204, and divide the group of audio devices 204 into subsets 104. Each subset 104 may include a master device 106 and one or more slave devices 108, in which the master device 106 provides audio data 102 to the slave device(s) 108 via a multicast transmission 116. Example processes by which the subsets 104 of audio devices 204 are formed are described with regard to FIGS. 3 and 4. For example, a master device 106 for a subset 104 may include a particular audio device 204 that is able to communicate data to the greatest number of other audio devices 204. The slave devices 108 within the subset 104 may include audio devices 204 having a RSSI value or other signal quality metric, for communications received from the master device 106, that exceeds a threshold value.

The memory 622 may additionally store a master device module 636. The master device module 636 may be used if the device grouping module 634 determines that the computing device 602 is to function as a master device 106 within a subset 104 of audio devices 204. The master device module 636 may request and receive audio data 102 from a content server 114, other computing device 602, or other source of audio data 102. In some implementations, a system 100 may include multiple master devices 106, and a first master device 106(1) may receive audio data 102 from a remote data source, then provide the audio data 102 to one or more other master devices 106 via communication links with an access point 112. In such cases, the master device module 636 may request and receive audio data 102 from another audio device 204, such as the master device 106 for a different subset 104 of devices. The master device module 636 may then provide the audio data 102 to one or more slave devices 108 via a multicast transmission 116. In some implementations, the master device module 636 may also determine remaining devices 110 or master devices 106 of other subsets 104 that are to receive the audio data 102 via communication links with an access point 112, and provide the audio data 102 to such devices.

The memory 322 may also store a slave device module 638, which may be used if the device grouping module 634 determines that the computing device 602 is to function as a slave device 108 within a subset 104 of audio devices 204. A slave device 108 may be configured to receive audio data 102 from a master device 106 via a multicast transmission 116, such as by activating a multicast receiver 620. In some implementations, one or more slave devices 108 may be configured to receive audio data 102 via communication links with an access point 112 rather than a multicast transmission 116. For example, after formation of one or more subsets 104 of devices, slave devices 108 that are not included in a subset 104 may instead request and receive audio data 102 via the access point 112.

Other modules 640 may also be present in the memory 622. For example, encryption modules may be used to encrypt and decrypt communications between computing devices 602. The other modules 640 may also include modules for receiving user input to configure parameters of audio devices 204, set threshold values of the threshold data 308, and so forth. Other modules 640 may further include location modules that may be used to determine the location of particular audio devices 204 relative to other audio devices 204 or access points 112. For example, the locations of devices may be determined using a radio navigation-based system, such as a Global Positioning System (GPS) receiver, or other terrestrial or satellite-based navigational systems. As another example, the locations of devices may be determined using one or more device sensors or other I/O devices 516.

Other data 642 within the data store 626 may include user input data, such as configurations and settings associated with computing devices 602. Other data 642 may also include security data, such as encryption keys and schema, access credentials, and so forth. Other data 642 may additionally include rules, algorithms, and so forth, used by the audio application(s) 632 to synchronize and control audio output, such as by determining time delays between the emissions of sounds based on the locations of audio devices.

In different implementations, different computing devices 602 may have different capabilities or capacities. For example, servers may have significantly more processor 606 capability and memory 622 capacity compared to the processor 606 capability and memory 622 capacity of audio devices 204.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
an access point;
a plurality of audio devices in communication with the access point;
one or more memories storing computer-executable instructions; and
one or more hardware processors to execute the computer-executable instructions to:
receive a command to initiate an audio output using the plurality of audio devices;
determine respective signal quality values from each audio device of the plurality of audio devices;
determine a first subset of the audio devices having respective signal quality values greater than a first threshold signal quality value, wherein the first threshold signal quality value corresponds to one or more of: a data rate for communication between the audio devices that utilizes a quantity of network resources less than a maximum quantity of network resources;
determine that a first audio device of the first subset is able to communicate audio data to a first greatest number of other audio devices of the plurality of audio devices;
determine that respective signal quality values for communications between a second subset of the plurality of audio devices and the first audio device exceed a second threshold signal quality value;
cause the first audio device to receive the audio data via the access point and provide the audio data to the second subset of the plurality of audio devices via a first multicast transmission; and
cause a third subset of the audio devices not included in the second subset to receive the audio data via the access point.

2. The system of claim 1, further comprising computer-executable instructions to:
determine that the first audio device and a second audio device of the first subset are able to communicate the audio data to the first greatest number of the other audio devices of the plurality of audio devices; and
determine that a first signal quality value associated with communication between the first audio device and the access point is greater than a second signal quality value associated with communication between the second audio device and the access point.

3. The system of claim 1, further comprising computer-executable instructions to:
determine a fourth subset of the audio devices not included in the second subset or the third subset;
determine a second audio device of the fourth subset that is able to communicate the audio data to a second greatest number of other audio devices of the fourth subset;
cause the first audio device to provide the audio data to the second audio device via the access point; and
cause the second audio device to provide the audio data to at least one other audio device of the fourth subset via a second multicast transmission.

4. The system of claim 1, further comprising computer-executable instructions to:
cause at least a portion of the plurality of audio devices to provide signal quality data to at least one other audio device of the plurality of audio devices, wherein the signal quality data includes signal quality values, each respective signal quality value indicating a quality of a communication between an audio device and one or more of: the access point or another audio device.

5. A method comprising:
accessing group data indicative of a plurality of audio devices in communication with an access point;
determining a first audio device of the plurality of audio devices that is able to communicate audio data to a greatest number of other audio devices of the plurality of audio devices;
determining a first subset of the plurality of audio devices, the first subset including the first audio device and one or more of the other audio devices;
determining a remaining group of the plurality of audio devices not included in the first subset;
causing the first audio device to receive the audio data via the access point;
causing the first audio device to transmit the audio data to the one or more of the other audio devices of the first subset via a multicast transmission;
causing at least one audio device of the plurality of audio devices to provide signal quality data to at least one other audio device of the plurality of audio devices, wherein the signal quality data includes a signal quality value indicating a quality of a communication between the at least one audio device and one or more of: the access point or another audio device; and
causing, based at least in part on the signal quality data, the remaining group of the plurality of audio devices to receive the audio data via one or more of: the access point or a particular audio device included in the remaining group.

6. The method of claim 5, further comprising: determining, based on the signal quality data associated with the plurality of audio devices, that a signal quality value indicative of a signal quality for communications between the first audio device and the access point exceeds a threshold signal quality value.

7. The method of claim 5, further comprising:
determining at least two audio devices of the plurality of audio devices that are able to communicate the audio data to the greatest number of other audio devices of the plurality of audio devices, wherein the at least two audio devices includes the first audio device;
determining a first signal quality value associated with communication between the first audio device and the access point;
determining a second signal quality value associated with communication between a second audio device of the at least two audio devices and the access point; and
determining the first signal quality value to be greater than the second signal quality value.

8. The method of claim 5, further comprising:
prior to determining the first subset of the plurality of audio devices, determining respective signal quality values for each audio device of the one or more of the other audio devices, the signal quality values indicative of signal quality for communications between the one or more of the other audio devices and the first audio device; and
determining that the respective signal quality values to exceed a threshold signal quality value.

9. The method of claim 5, further comprising:
determining, based on the signal quality data associated with the plurality of audio devices, one or more signal quality values for the at least one audio device of the remaining group of the audio devices indicative of signal quality for communications between the at least one audio device and the access point;

determining the one or more signal quality values to be greater than a threshold signal quality value; and causing the at least one audio device to receive the audio data via the access point.

10. The method of claim 5, further comprising:

determining a second audio device of the remaining group of audio devices that is able to communicate the audio data to a greatest number of other audio devices of the remaining group;

determining a second subset of the audio devices including the second audio device and at least one other audio device of the remaining group;

causing the second audio device to receive the audio data via the access point;

causing the second audio device to provide the audio data to the at least one other audio device via one or more multicast transmissions; and causing the at least one other audio device to receive the audio data via the one or more multicast transmissions.

11. The method of claim 5, further comprising: receiving an audio command to initiate an audio output using the plurality of audio devices, wherein the group data is accessed responsive to the audio command.

12. The method of claim 5, further comprising:

determining, based on the signal quality data associated with the plurality of audio devices, one or more signal quality values for the at least one audio device of the plurality of audio devices, the one or more signal quality values indicative of signal quality for communications between at least one audio device and one or more of: the first audio device or the access point; and determine that the one or more signal quality values exceed a threshold signal quality value.

13. A system comprising:

one or more memories storing computer-executable instructions; and one or more hardware processors to execute the computer-executable instructions to:

access group data indicative of a plurality of devices;

determine a first device of the plurality of devices that is able to communicate data to a count of other devices of the plurality of devices, wherein the count of other devices is greater than or equal to a threshold count of devices;

determine signal quality values indicative of signal quality for communications between one or more second devices and the first device to be greater than a threshold signal quality value;

determine a first subset of devices that includes the first device and the one or more second devices of the plurality of devices;

cause the first device to provide the data to the one or more second devices via a multicast transmission; and cause the one or more second devices to receive the data via the multicast transmission.

14. The system of claim 13, further comprising computer-executable instructions to:

determine a signal quality value indicative of a signal quality for communications between the first device and an access point to be greater than a threshold signal quality value;

wherein the first device is included in the first subset of devices responsive to the signal quality value being greater than the threshold signal quality value.

15. The system of claim 13, further comprising computer-executable instructions to:

determine at least two devices of the plurality of devices that are able to communicate the data to the threshold count of other devices; and determine a first capacity measurement indicative of a quantity of network resources used by the first device, wherein the first capacity measurement is based on a first count of devices accessible by the first device and a first signal quality value associated with communications by the first device;

determine a second capacity measurement indicative of a quantity of network resources used by a second device of the at least two devices, wherein the second capacity measurement is based on a second count of devices accessible by the second device and a second signal quality value associated with communications by the second device; and determining the first capacity measurement to indicate a smaller quantity of network resources than the second capacity measurement.

16. The system of claim 13, further comprising computer-executable instructions to:

determine one or more remaining devices of the plurality of devices that are not included in the first subset;

determine signal quality values indicative of signal quality for communications between the one or more remaining devices and an access point to be less than a threshold signal quality value; and cause the one or more remaining devices to receive the data via the access point.

17. The system of claim 13, further comprising computer-executable instructions to:

determine at least two remaining devices of the plurality of devices that are not included in the first subset;

determine a third device of the at least two remaining devices that is able to communicate data to a greatest number of other devices of the at least two remaining devices; and cause the third device to provide the data to at least one other device of the remaining devices via one or more multicast transmissions.

18. The system of claim 13, further comprising computer-executable instructions to:

determine one or more remaining devices of the plurality of devices that are not included in the first subset to include a count of devices less than a threshold count; and cause the one or more remaining devices to receive the data via an access point.

19. The system of claim 13, further comprising computer-executable instructions to:

cause at least one device of the plurality of devices to determine signal quality values associated with communication between the at least one device and at least a portion of the plurality of devices; and cause the at least one device to provide data indicative of the signal quality values to at least one other device of the plurality of devices.

20. A system comprising:

one or more memories storing computer-executable instructions; and one or more hardware processors to execute the computer-executable instructions to:

access group data indicative of a plurality of devices;

determine a first device of the plurality of devices that is able to communicate data to a count of other devices of the plurality of devices, wherein the count of other devices is greater than or equal to a threshold count of devices;

determine a first subset of devices that includes the first device and one or more second devices of the plurality of devices;

cause the first device to provide the data to the one or more second devices via a multicast transmission;

cause the one or more second devices to receive the data via the multicast transmission;

determine one or more remaining devices of the plurality of devices that are not included in the first subset to include a count of devices less than a threshold count; and cause the one or more remaining devices to receive the data via an access point.

* * * * *